UNITED STATES PATENT OFFICE.

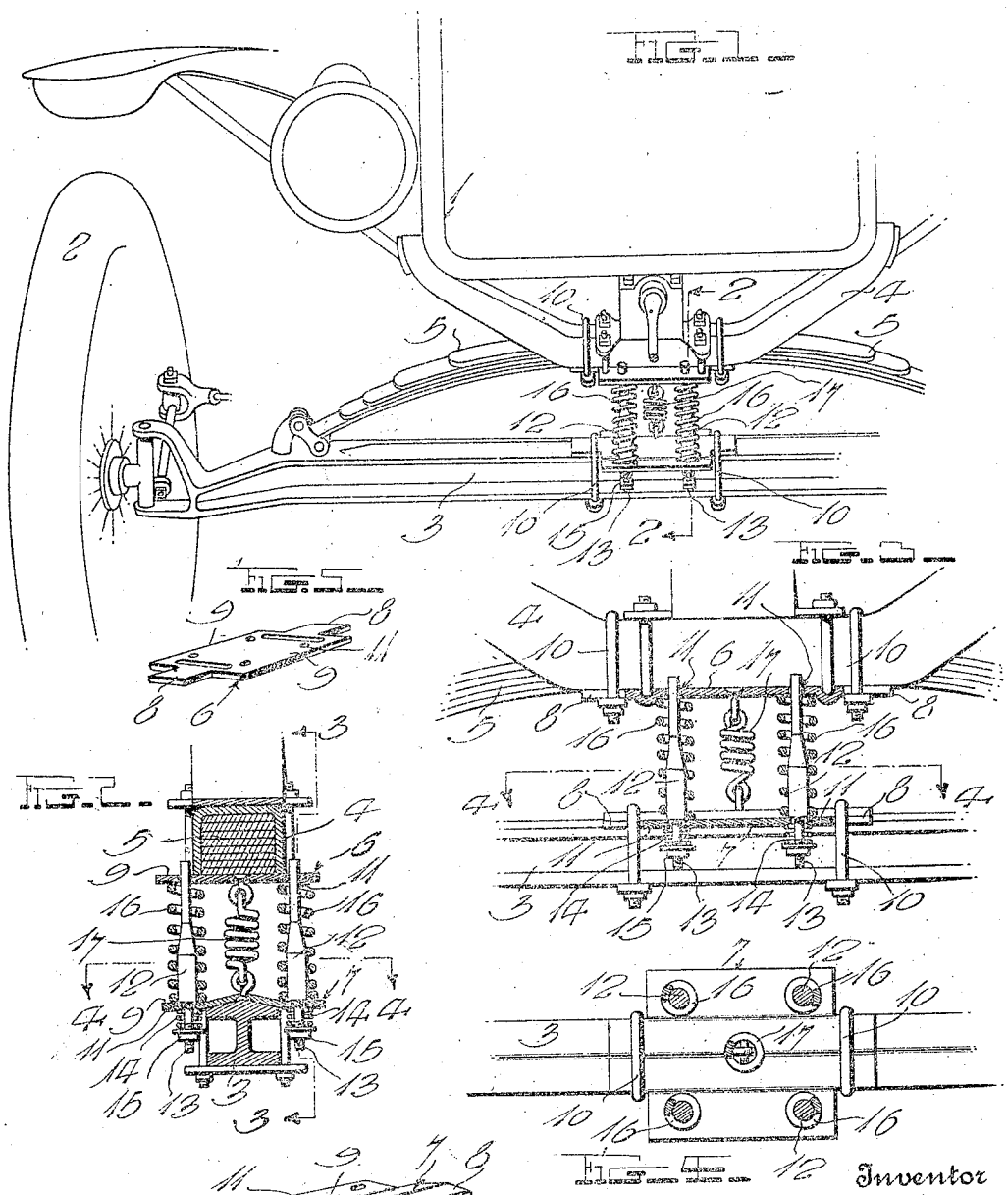

HERMAN E. THOMPSON, OF MORATTICO, VIRGINIA.

SHOCK-ABSORBER FOR VEHICLES.

1,377,104.      Specification of Letters Patent.      Patented May 3, 1921.

Application filed July 6, 1920. Serial No. 394,134.

*To all whom it may concern:*

Be it known that I, HERMAN E. THOMPSON, a citizen of the United States, residing at Morattico, in the county of Lancaster and State of Virginia, have invented certain new and useful Improvements in Shock-Absorbers for Vehicles; and I do declare the following to be a full, clear, and exact description of the invention, such as will enable others skilled in the art to which it appertains to make and use the same.

This invention relates to improvements in shock absorbers, and it has more particular reference to one which is especially designed for use on Ford machines, although, it is not to be restricted for use on this type of car.

Owing to the weak construction of the front leaf spring of a Ford truck, the spring oftentimes breaks, due to the many strains that it is subjected to. These springs are broken rather frequently and should be protected.

In view of the foregoing circumstances, I have devised a device to be known as a shock absorber which is designed for disposition between the front cross-bar of the chassis frame and the front axle, it being such that it will not only save the leaf spring but will effectively absorb all shocks and prevent sudden rebounds, and in conjunction with the leaf spring will provide an extremely effective yieldable support for the body.

Another object of the invention is to provide a device of the above mentioned character which is extremely simple in construction, strong, durable, easy to install, and effective in operation, yet inexpensive to both the manufacturer and the user.

A further object of the invention is to provide a shock absorbing device for installation between a leaf spring and axle which is such in construction, that it will permit relative lateral shifting between its respective parts, so as to compensate for the relative lengthwise movement of the axle and spring caused by sidewise movement of the body of the vehicle.

Other objects and advantages of the invention will be apparent during the course of the following description.

In the accompanying drawings forming a part of this specification and in which like numerals are employed to designate like parts throughout the same:

Figure 1 is a front end view of a portion of an automobile equipped with my improved shock absorbing device.

Fig. 2 is an enlarged transverse vertical sectional view on the line 2—2 of Fig. 1, looking in the direction of the arrows.

Fig. 3 is a section taken on the plane of the line 3—3 of Fig. 2.

Fig. 4 is a horizontal view on the line 4—4 of Figs. 2 and 3.

Figs. 5 and 6 are detail perspective views of the attaching plates.

In the drawings I have shown a portion of a Ford machine, either a touring car or a truck. In most instances my device will be used on trucks which are subjected to more severe strains than the pleasure car.

By referring to the drawings it will be seen that the numeral 1 designates the body of the machine, while the numeral 2 indicates one of the wheels thereof which has an axle 3 connected to it.

Between the front cross-bar 4 and the axle 3 is a leaf spring 5 which supports the entire front end of the body. Due to the connection of the spring with the axle, the two are permitted to move not only toward and from each other, but lengthwise with respect to each other when the spring flattens out. This is the ordinary construction of the front end of a Ford, consequently, it need not be described further.

What I do is to provide a novel shock absorbing device for disposition between the spring 5 and axle 3. The device comprises a pair of substantially rectangular plates 6 and 7 which may be termed upper and lower plates for convenience of description. Each plate includes reduced portions 8 and flanged portions 9. The upper plate 6 is secured lengthwise on the frame 4 by U-clips 10 which surround the reduced portions 8. On the other hand, the other plate 7, which is shaped to properly fit the axle 3, is also secured to the latter in a like manner by U-clips 10. Due to the width of the plates, their flanges 9 extend beyond the opposite sides of the members 3 and 5 to which they are secured. The flanges of both of the plates are provided with a plurality of holes 11 and the holes in one of the plates, preferably the lower one, are somewhat enlarged or elongated as shown in Fig. 6. These holes serve to receive in them, a plurality of guide pins 12 which are preferably tapered. One end of each pin is threaded and reduced as shown at 13, and this end of each pin extends through the elongated openings 11 in the plate 7 so that the shouldered part of the pin rests on the upper face of this plate. On the reduced ends of the pins are small coil springs 14 held in position by nuts 15. It is the function of the springs to hold the pins in place and prevent excessive rattling thereof. The opposite ends of the pins extend slidably through the openings in the plate 6. Coiled springs 16 surround the pins and serve as load supporting springs. It is to be noted that by tapering the pins 12 as shown, and providing the size of springs shown there will be a snug fit between the spring and large portions of the pins. This arrangement is advantageous in that it insures that the springs will be in effective position at all times and will not incline or fall to one side or the other as they would if there were no snug fit. To take up and prevent any violent rebound I employ a centrally arranged heavy coiled spring 17.

When the vehicle encounters a rut or other rough place in the road, the axle 3 and spring 5 will move toward each other, and at the same time the spring will flatten out. During this operation, the plates 6 and 7 will likewise move toward each other and in so doing will compress the springs 16, which are of a size and strength to support the maximum load or weight of the front end of the car. However, these springs 16 will yield sufficiently to absorb all shock, while the all violent rebound is taken care of by the spring 17 which resists the separation of the plates. Emphasis is to be laid on the fact that, due to the rocking connection of the guide pins 12 at their lower ends with plate 7, the plates are also permitted to have relative lengthwise or lateral shifting movement which compensates for the movement of the body with respect to the axle. This feature is important in that it prevents breakage of the parts which would probably occur if the pins were rigidly connected to the lower plate.

My shock absorbing device is intended for disposition between the front axle and spring of a Ford truck so as to absorb all shocks and rebounds at this end of the truck and at the same time prevent breaking of the spring which so often occurs. My device is simple in construction, easy to install, inexpensive, and above all, is extremely effective in use. Due to the construction of the various parts of the device, sufficient play is permitted to prevent breakage of the parts. The load supporting springs are always in proper and effective position and rattling of the parts is prevented.

From the foregoing description, taken in connection with the accompanying drawings, it is believed that persons skilled in the art to which this invention relates will be able to obtain a clear understanding of the same. In view of this, further description is deemed unnecessary.

It is to be understood that the form of my invention herein shown and described is to be taken as a preferred form of the same, and that various minor changes in the shape, size, and arrangement of parts may be resorted to without departing from the spirit of the invention or the scope of the subjoined claims.

I claim:

1. A shock absorbing device for disposition between an axle and a spring which are movable toward and from each other and also movable lengthwise with respect to each other comprising upper and lower apertured attaching plates, the apertures in the lower plate being comparatively large, and this plate being intended to be secured to the axle, while the remaining plate is intended to be secured to the spring, a plurality of guide pins having their lower ends reduced in diameter to form shoulders bearing on the upper face of the lower plate, the reduced portions of these pins extending through the comparatively large apertures in this plate, heads on the lower ends of said pins, the opposite ends of these pins extending through the apertures in the upper plate, coiled springs surrounding the reduced ends of the pins between said heads and lower face of the adjacent plate, and other and larger coiled springs surrounding the pins between the plates.

2. In a shock absorbing device for disposition between an axle and a leaf spring which are movable toward and from each other and are also movable lengthwise with respect to each other, comprising upper and lower attaching plates, reduced at their opposite ends, the upper plate being adapted for connection with the front cross bar of the chassis of the vehicle by means of U clamping bolts designed to surround the chassis bar and reduced ends of said plate, the lower plate being adapted for lengthwise disposition on the upper face of the front axle, having its ends reduced so that it can be connected to the axle in the same manner as above set forth, said plates being of a width to extend beyond the opposite side of the parts to which they are connected, the extended portions of the plates being apertured and the apertures in the lower plates being elongated, guide-pins having their upper ends extending through the apertures in the upper plate, having their lower ends reduced and said reduced ends passing through the elongated openings in the lower plate, shoulders on the ends of the reduced part of said guide-pins, relatively small coiled springs surrounding the reduced portions of the ends between said shoulders and the lower plate, load supporting springs surrounding the pins between the plates, and a comparatively stiff rebound preventing spring arranged between the plates and connected at its opposite ends to the latter.

In testimony whereof I have hereunto set my hand.

HERMAN E. THOMPSON.